Nov. 29, 1960     R. S. WEBB     2,962,630
POWER FEED CONTROL

Filed April 13, 1959     2 Sheets-Sheet 1

INVENTOR.
Robert S. Webb
BY
ATTORNEY.

Nov. 29, 1960 R. S. WEBB 2,962,630
POWER FEED CONTROL
Filed April 13, 1959 2 Sheets-Sheet 2

INVENTOR.
Robert S. Webb.
BY
M K Murphy
ATTORNEY.

United States Patent Office 2,962,630
Patented Nov. 29, 1960

1

2,962,630

POWER FEED CONTROL

Robert S. Webb, Franklin, Mich., assignor to Elox Corporation of Michigan, Royal Oak, Mich., a corporation of Michigan Filed Apr. 13, 1959, Ser. No. 805,989

9 Claims. (Cl. 315—163)

This invention relates to electrical-discharge-machining equipment and to electro-chemical machining equipment and particularly to improved control apparatus for the automatic electrode power feed mechanism used in such equipment.

Electrical-discharge-machining, commonly referred to in the art as EDM, is carried on by passing a series of short duration, high-frequency, overvoltage discharges across a gap between an electrode and a conductive workpiece in the presence of a dielectric coolant.

Electro-chemical machining, sometimes referred to as ECM, is carried on by passing a substantially steady, unidirectional, low-voltage, high density current across a gap between an electrode and a conductive workpiece in the presence of an electrolyte.

In both machining processes the electrode, which may be large in area and heavy especially in ECM, is positioned in optimum relationship to the workpiece for best machining and is fed toward the work as stock is removed therefrom by automatic power feed means. This power feed means usually includes a rack or screw driven in either direction by a reversible motor through a gearbox, or a hydraulic ram under suitable valve control may be used.

It has been the practice in the art to automatically sense the voltage existing across the machining gap and, through suitable equipment, cause the power feed motor to advance or retract the electrode, or hold it stationary, in accordance with preselected machining rate.

For an understanding of the principles of my invention, reference is made to the accompanying drawings in which.

Figure 1:
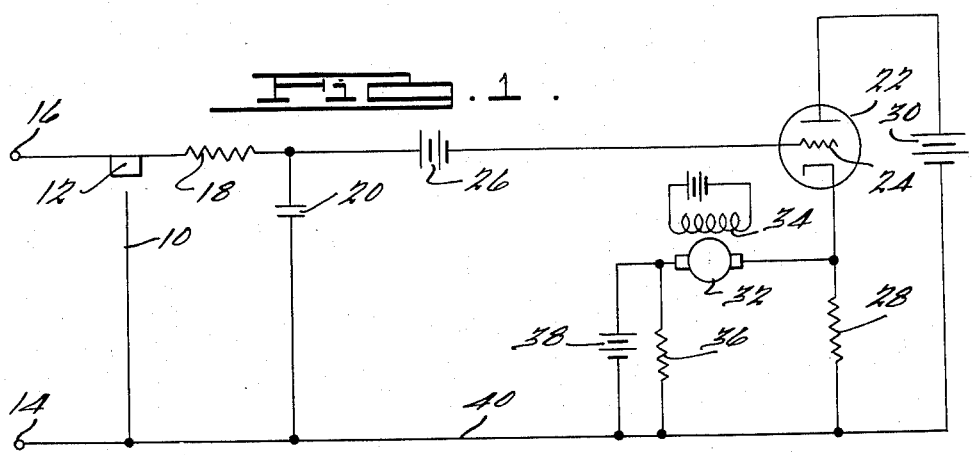
Fig. 1 is a simplified schematic circuit diagram of an EDM power feed control now in use.

Referring to Fig 1, it will be seen that I have shown an electrode 10 spaced from a workpiece 12, it being understood that the electrode will be supported in a holder, which holder is adapted to be moved to advance or retract the electrode with respect to the workpiece, and that dielectric fluid will be circulated through the machining gap Terminals 14, 16, represent the output from a suitable power supply which supplies power to the gap of selected voltage, frequency and current. Examples of such power sources are described in Matulaitis Patent No. 2,804,575, and in my co-pending application Serial No. 747,078, filed July 7, 1958.

In this circuit, resistor 18 and condenser 20 form an averaging network which stores in condenser 20 the average gap voltage occurring across the electrode 10 and work 12 as machining is carried on. A vacuum tube 22 has its grid 24 connected to one side of condenser 20 through bias voltage 26, its cathode connected to the other side of the condenser through resistor 28, and its anode connected to plate supply voltage 30.

The power feed motor (which is suitably operatively connected to the electrode through a speed reducing gearbox not shown) has an armature 32 and a shunt field 34. The armature 32 is connected at each side to the respective upper ends of resistors 28 and 36, the lower ends of which are connected to the lead 40 which is common to the electrode side of the circuit. A reference or backup voltage 38 is connected in shunt across resistor 36.

It will be understood that while voltages 26, 30, 38, etc., are represented as batteries, these voltages may be supplied from batteries or from rectified voltages derived from transformer taps, or other suitable means.

In the operation of the Fig. 1 circuit, pulsating voltage applied across the gap will be averaged across condenser 20, and this stored voltage will tend to bias grid 24 of tube 22 positive. Should the voltage across the gap be lower than selected for optimum machining, or zero, as would be the case if the gap is short-circuited, then the voltage stored in condenser 20 will be insufficient to overcome the sum of negative bias 26 plus backup reference voltage 38 and tube 22 will be rendered non-conductive.

Under such condition, reference voltage 38, which has been preselected as to magnitude in accordance with desired machining characteristics, will supply power to the armature circuit. Electrons will flow through the loop 38, 40, 28 and 32, and the armature will rotate to retract the electrode 10 until the voltage across the gap rises such that the condenser 20 is at a voltage magnitude sufficient to cause tube 22 to overcome reference 38.

The null condition of the circuit prevails when the stored voltage in condenser 20 is sufficiently high to render tube 22 partially conductive to the extent that enough current is drawn through resistor 28 to just balance the reference voltage 38. Under this condition, there is no current flow through armature 32, and electron flow is through resistor 28 from the cathode of tube 22, and through the anode of the tube to voltage source 30.

Downfeed of the electrode 10 occurs when the voltage stored in condenser 20 is sufficiently high to overcome reference 38. Tube 22 then will become more conductive, and the voltage across resistor 28 will rise above that of reference 38. A shunt electron flow will occur through resistor 36, through the armature 32, and through the tube 22, and the armature will rotate to downfeed the electrode 10.

The circuit described is subject to several basic weaknesses. The motor armature is controlled in a cathode follower type of operation, and the maximum voltage that can be applied to the armature is that represented by the difference in the voltage across condenser 20 over or under the reference 38. Motors of sufficient power to drive the power feed mechanism require several volts to drive the armature, thus a variation in gap voltage of several volts is required for automatic adjustment of the electrode position. Another weakness resides in the fact that the vacuum tube cathode follower type of amplifier has a voltage gain of less than one volt and this limits the type of motor that may be used to one having very low voltage, high current characteristic. This not only requires many parallel vacuum tubes for operation, but is extremely difficult to obtain commercially.

Figure 2:
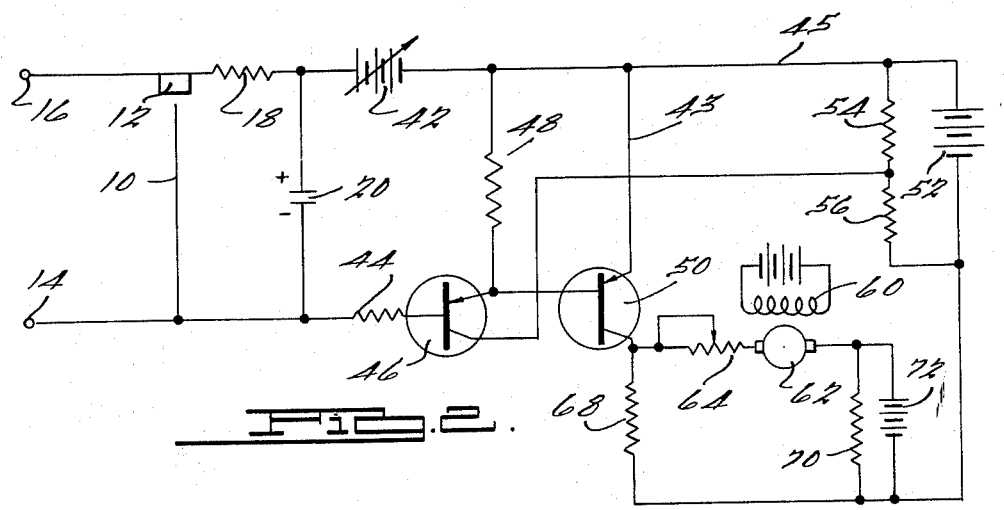
Fig. 2 is a schematic circuit diagram of an improved control using transistors.

My improved circuit, shown schematically in Fig. 2, overcomes these weaknesses. Here, a network comprising resistor 18 and condenser 20 stores average voltage across the gap between electrode 10 and workpiece 12. The condenser is connected at one side to a reference voltage 42 and at the other side to the base of transistor 46 through limiting resistor 44. The emitter of transistor 46 is connected to the reference voltage 42 through a current limiting resistor 48 and to the base electrode of a second transistor 50. The collector of transistor 46 is connected to the midpoint of resistor 54—56, which divides the voltage 52, the latter being the voltage supply for downfeed of the servo.

The emitter of transistor 50 is connected through leads 43 and 45 to downfeed voltage 52, the latter being connected in bucking relationship to backup voltage 72 which is shunted by signal resistor 70. A second signal resistor 68 connects the collector of transistor 50 with voltages 52 and 72.

The servo-motor armature 62 is connected to the upper ends of the signal resistors 68 and 70 respectively and has a series rheostat 64 for adjusting maximum speed. The motor field 60 has its own voltage supply.

In the Fig. 2 circuit, during a condition of too small gap spacing, or short circuit, condenser 20 will be at low potential—lower than reference 42. There will be then zero or positive voltage between base and emitter of transistor 46 and the latter will be non-conductive. Then transistor 50 is also rendered non-conductive.

Electron flow under this condition will be from backup voltage 72 through signal resistor 68, rheostat 64 and armature 62. The armature will rotate in accordance with preselected circuit parameters to retract electrode 10.

The null condition occurs when the voltage stored in condenser 20 is just slightly more positive than preset reference voltage 42. By "slightly more positive," I mean more positive in the order of a tenth or a few tenths of a volt. The transistor circuit as shown is known as a common emitter circuit and is characteristically both a current and voltage amplifier. Thus electron flow is from condenser 20, through limiting resistor 44, through base-emitter of transistor 46, limiting resistor 48 and reference 42, and this flow through the base-emitter junction of transistor 46 is amplified because of the voltage on the collector of transistor 46 derived from the midpoint of resistor 54—56 which shunts downfeed voltage 52. Since 46 has been rendered conductive, electron flow is from voltage 52, through transistor 46 to the base-emitter junction of transistor 50 and back to voltage 52. This renders 50 partially conductive causing electron flow in the loop 52, 68, 50, 43 and 45. At this null or hold condition, the voltage drop across resistor 68 equals backup voltage 72 and no rotation of armature 62 occurs.

The third condition occurs when the voltage on condenser 20 is substantially higher than reference 42, which represents open circuit or at least greater than normal gap spacing. In such instance, the voltage differential may be in the order of one volt or more, thus causing amplifying transistor 46 and output transistor 50 both to become more conductive. This will cause the voltage drop across resistor 68 to increase and exceed that of backup supply 72, whereupon a shunt electron flow from voltage source 52 through resistor 70, armature 62, rheostat 64 and transistor 50, will take place and armature 62 will downfeed.

The Fig. 2 circuit is much more sensitive and stable in operation than that of Fig. 1. A gap voltage change of a volt or less will cause the transistor network to switch from full cutoff to full conduction and thus change from full backup velocity to full downfeed velocity of armature 62. In addition, the voltage drop in the armature is independent of the actual change in gap voltage. A servo-motor may be chosen with an armature that has voltage characteristics matching the voltage rating of transistor 50. This is important from the commercial standpoint in that standard commercially available motors may be used.

Furthermore, in this circuit it is impossible to overload the transistors, even accidentally as by short circuit of the motor armature itself. Both the input current to transistor 46 and the drive current of transistor 50 are controlled by divider resistor 54—56, and the output current of transistor 50 is further limited by resistors 68—70 thus insuring that maximum current ratings of the transistors will not be exceeded.

Figure 3:
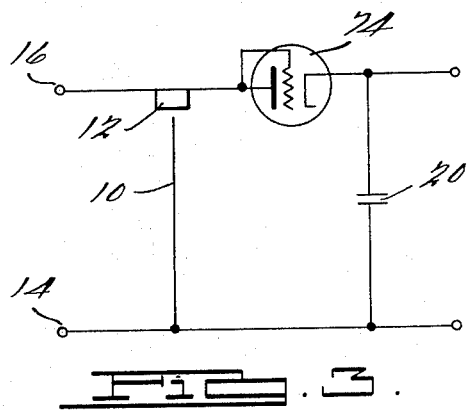
Fig. 3 is a modification of the Fig. 2 circuit.

Fig. 3 shows a modification of Fig. 2, by means of which the control circuit is rendered responsive to variations in the peak voltages across the gap rather than the average voltage. By "peak voltage," I mean that voltage which may exist for an extremely short increment of time, one or two microseconds for example—just sufficient to ionize the gap. Storage of these peak striking voltages (so that the average of the striking voltages is stored rather than the average of the voltages existing across the gap) provides wider variation of voltage as a signal to the control system and thus improved sensitivity of operation.

A "peak reading" diode 74 is connected in the circuit, in place of or in series with the resistor 18. This results in peak voltages being stored in the condenser 20, but leakage toward the gap due to lower voltages existent thereacross is blocked by the diode so condenser 20 is not discharged thereby.

The Fig. 3 circuit is otherwise identical with Fig. 2, and is particularly adapted in cases where extreme precision and excellent surface finish is required.

As stated, the above described power feed systems each embody an electric motor for adjusting the position of the electrode. The motor is usually connected to the electrode holder through a high ratio reduction gearing and a highly satisfactory feed system results. However, when electrodes of relatively great weight are used as, for example, when machining large forging and stamping dies, the power feed motor and associated apparatus becomes rather bulky, there is a noticeable slowing of the signal response and some mechanical backlash becomes inevitable.

Figure 4:
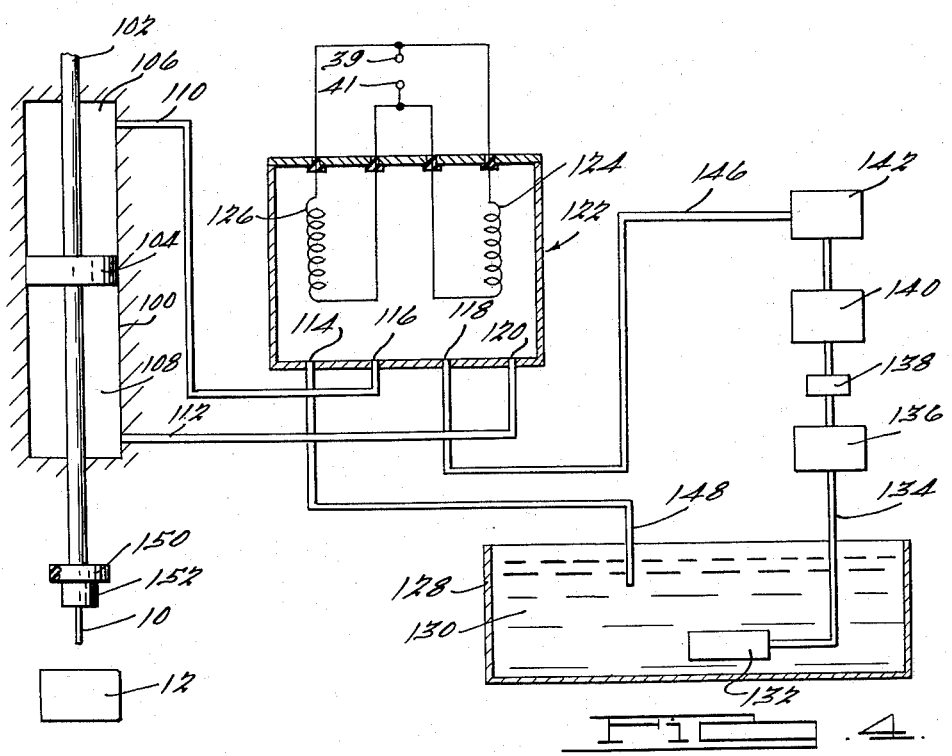
Fig. 4 is a schematic showing of a hydraulically actuated power feed control which may be used with my improved control circuit.
Figure 5:
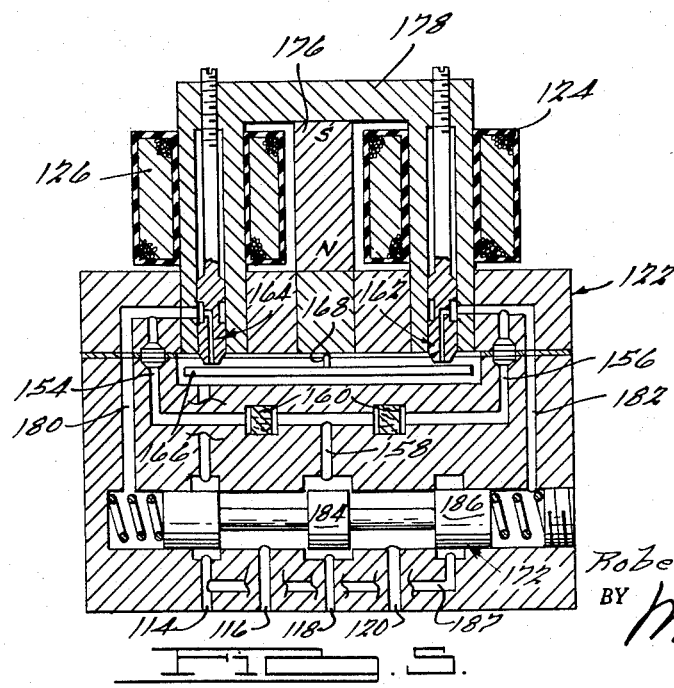
Fig 5 is an enlarged detail of the valve used with the Fig. 4 feed.

I have found that positioning of the electrode by hydraulic means overcomes the aforementioned objections provided that a quick-response, low inertia control valve is used. Figs. 4 and 5 show such a hydraulic system.

Referring to these figures, it will be seen that terminals 39 and 41 of Fig. 4 correspond to the connections of the power feed control system to opposite sides of the armatures 32 and 62 of Figs. 1 and 2. The sensing and amplifying circuits described above, therefore, may be identical and will not be again described.

The electrode 10 (which may weigh a few ounces or several hundred pounds) is held in a collet 152 carried by an insulating plate 150. The latter is in turn carried by piston rod 102 which is attached to piston 104 in cylinder 100. It will be understood that cylinder 100 is rigidly mounted on the machine column. The hydraulic servo control valve which regulates flow of fluid to each end of cylinder 100 is generally designated by numeral 122. This valve is shown in detail in Fig. 5.

The fluid circuit comprises a reservoir 128 which contains fluid 130. The fluid is drawn through screen 132 through input suction line 134 by pump 136. The pump, which operates in a range of from 500 to 3000 p.s.i. forces the fluid through check valve 138 and filter 140 to accumulator 142, which stores hydraulic pressure and eliminates surging. Pressure line 146 connects with input port 118 of valve 122. The hydraulic circuit is completed by the valve through the hydraulic cylinder, and any flow of fluid is exhausted by valve exhaust port 114 into line 148.

As seen from Fig. 5, the valve 122 has a pair of energizable coils 124—126. These coils may be connected in series, parallel or in "push-pull," it being necessary only to correctly phase the coils such that the desired operation is obtained with a reversal of polarity across them. In this instance, the coils are connected in parallel. The valve 122 is a two-stage valve and embodies a sensitive first stage and a second stage which is operable in response to operation of the quickly responsive first stage.

In other words, there is hydraulic amplification in the valve itself which causes the relatively low differential pressures developed in the first stage to be amplified in the second stage in such manner that much higher pressures are applied to operation of the piston 104.

The first or electrically operated stage of the valve is controlled by the flapper 166. This flapper is pivotally mounted at 168 and its position is governed by permanent magnet 176 and by coils 124, 126, which add or subtract flux in accordance with energization thereof.

The enlarged spool portions of the valve spool 172 are so proportioned that in the null condition illustrated, sufficient clearance is provided such that a leakage flow of from 10% to 20% of normal flow is permitted through the valve. That is to say, fluid flows through pressure port 118, around portion 184, through passage 158, filters 160, passages 154 and 156 to nozzles 162, 164. Passages 180, 182, and ports 116 and 120 are open to this flow, but inasmuch as the valve is balanced, no action results.

Let it be assumed that the polarity of terminals 39—41 (Fig. 4) is such that downfeed of the electrode 10 is called for. In such instance, coils 124, 126, are energized in such polarity that flapper 166 is attracted toward nozzle 164 and away from nozzle 162. As flapper 166 moves toward nozzle 164, increased pressure is developed in passages 154, 180, and pressure is decreased in passages 156, 182, and valve spool 172 is moved to the right. This exposes port 116 to full pressure of port 118 and port 120 is opened to exhaust port 114 by movement of spool portion 186 to uncover passage 187. Thus pressure is increased at port 116 and decreased at port 120, and piston 104 will be moved downwardly.

When electrode retraction or backup is signalled, coils 124, 126, are oppositely polarized and opposite movement of flapper 166 causes pressure on port 120 and exhaust on port 116.

The advantage of the two-stage valve in operation of the power feed is believed clear from the above when it is considered that redistribution of fluid pressures from the first valve stage may result in only one or two pounds per square inch net differential on spool 172. Cylinder 100 may be operated at 1000 p.s.i. or more and have a ram area of 10 square inches or more to generate up to 50,000 pounds of force. To operate spool 172 directly with sufficient sensitivity would be extremely difficult, while operation of flapper 166 with the relatively small electrical forces available is entirely practical. Thus an extremely sensitive, quick acting and high power feed mechanism results.

Furthermore as pointed out above, the hydraulic power feed system just described is entirely free of backlash. As is well known, spur gears inherently have considerable backlash and this causes a considerable amount of loose coupling in all-electric power feed systems which must use a reducing gear train.

In a typical EDM operation, the electrode may downfeed at a rate of 20 inches per minute. As the electrode approaches the workpiece and establishes a gap of approximately .003 inch, machining begins, and the servo must establish a null condition and thereafter feed at a very slow rate. If there is backlash in the system to any considerable degree, the electrode will overrun and the sensing circuit will instantly signal backup. Upon backup, the backlash causes overrun in the opposite direction and a continuous hunting action is set up which is detrimental to the stable operation of the device.

In my improved hydraulic feed system which is fluid tight with no entrapped air or gas, and continuously circulatory, hunting is entirely eliminated. Electrode movement of a few thousandths or even a few ten-thousandths of an inch or full downfeed at 20 inches per minute is accomplished with substantially no backlash with properly built equipment, even with large electrodes. Rapid deceleration of the electrode, for example, will tend to compress the hydraulic fluid, but as the fluid is substantially noncompressible, the result is that the electrode is stopped in a shorter distance with no hunting.

There is, of course, some minute compressibility of the fluid and some bending or deflection of the mechanical elements, but this is slight and not objectionable. The superiority of the hydraulic over the mechanical feed system is in the order of 10 to 1000 times depending upon the size of the equipment.

Another significant advantage resides in the increased sensitivity or, in other words, in the faster response. The hydraulic system is charged to full pressure at all times and initiation of or reversal of operation is accomplished simply by actuation or a light servo valve. This valve has comparatively low mechanical and electrical inertia, as compared with the armature of a large electric motor for instance, and thus response time is much less.

It will be understood, of course, that while I show and describe power feed means for advancing and retracting the electrode relatively to the workpiece, the power feed means could be readily made to advance and retract the workpiece relatively to the electrode, and in the claims appended hereto, I do not intend to limit the scope of my invention to the disclosure which has been made for illustrative purposes only.

I claim:

1. In combination with electrical-discharge machining equipment having means for passing current across a gap between an electrode and a workpiece whereby the workpiece is eroded, servo means for controlling the gap spacing of the electrode and workpiece including electrically operated reversible motive means, means for causing automatic operation of said motive means to vary the gap spacing in response to variations in gap voltage comprising, a network for storing average gap voltage, a reference voltage, a pair of voltages connected across said motive means in opposed polarity relationship, and means for selectively rendering said opposed voltages effective on said motive means in response to rise or fall of said network voltage relative to said reference voltage including a transistor connected between one of said opposed voltages and said motive means and means for controlling the conductivity of said transistor in response to rise and fall of said network voltage.

2. In combination with electrical-discharge machining equipment having means for passing current across a gap between an electrode and a workpiece whereby the workpiece is eroded, servo means for controlling the gap spacing of the electrode and workpiece including electrically operated reversible motive means, means for causing automatic operation of said motive means to vary the gap spacing in response to variations in gap voltage comprising, a network for storing gap voltage, a one-way current conducting device in the circuit between said gap and said network, a reference voltage, a pair of voltages connected across said motive means in opposed polarity relationship, and means for selectively rendering said opposed voltages effective on said motive means in response to rise or fall of said network voltage relative to said reference voltage including a transistor connected between one of said opposed voltages and said motive means and means for controlling the conductivity of said transistor in response to rise and fall of said network voltage.

3. In combination with electrical-discharge machining equipment having means for passing current across a gap between an electrode and a workpiece whereby the workpiece is eroded, servo means for controlling the gap spacing of the electrode and workpiece including a motor having a reversible armature, means for causing automatic operation of said armature to vary the gap spacing in response to variations in gap voltage comprising, a network connected across said gap for storing gap voltage, a pair of unequal voltages connected across said armature in opposed polarity relationship, a reference voltage, means for comparing the voltage of said network with said reference voltage and for biasing said armature for movement in one direction or the other comprising, a first transistor having its base connected to said network, its emitter connected to said reference voltage and its collector connected to one of said opposed voltages, and a second transistor having its base connected to the emitter of said first transistor, its emitter connected to said one opposed voltage and its collector connected to said armature whereby variation in network voltage relatively to reference voltage will control conduction of said transistors and thus electron flow through said armature.

4. The combination set forth in claim 3 wherein a diode is connected between said gap and said network for blocking current flow from said network back to said gap.

5. In combination with electrical-discharge machining equipment having means for passing current across a gap between an electrode and a workpiece whereby the workpiece is eroded, servo means for controlling the gap spacing of the electrode and workpiece including a motor having a reversible armature, means for causing automatic operation of said armature to vary the gap spacing in response to variations in gap voltage comprising, a condenser connected across the gap for storing gap potential, a preset reference voltage, a first transistor connected in series with said gap and said reference voltage in such relation that said transistor is cut off or rendered conductive in response to rise or fall of said gap potential with respect to said reference voltage, a pair of voltages connected across said armature in polarity bucking relation, a second transistor connected in series with one of said voltages, means connecting the emitter of said first transistor with the base of said second transistor whereby said second transistor will cut-off or conduct in response to a signal from said first transistor and means connecting the base of said first transistor with a power source.

6. The combination set forth in claim 5 wherein said connection between said first transistor and said power source includes a current limiting resistor.

7. In combination with electrical-discharge-machining equipment having means for passing current across a gap between an electrode and a workpiece whereby the workpiece is eroded, servo means for controlling the gap spacing of the electrode and workpiece including electromagnetically controlled reversible motive means operable to vary the gap spacing in response to variations in gap voltage comprising, a network connected across the gap for storing gap voltage, a pair of voltages connected to said motive means in opposed polarity relationship, a reference voltage, means for comparing the voltage of the network with the reference voltage and for biasing said motive means for movement in one direction or the other comprising, a transistor having its base-emitter junction connected to said network and to said reference voltage in such manner that said transistor is rendered conductive or non-conductive in response to selected unbalance between the voltages of said network and said reference, and its collector-emitter junction connected to said motive means and said pair of voltages in such manner that one or the other of said opposed voltages is rendered effective on said motive means to cause movement thereof in selected direction.

8. In combination with electrical-discharge-machining equipment having means for passing current across a gap between an electrode and a workpiece whereby the workpiece is eroded, servo means for controlling the gap spacing of the electrode and workpiece including electromagnetically controlled reversible motive means operable to vary the gap spacing in response to variations in gap voltage comprising, a network connected across the gap for storing gap voltage potential, a pair of voltages connected to said motive means in opposed polarity relationship, a reference voltage, means for comparing the voltage of the network with the reference voltage and for biasing said motive means for movement in one direction or the other comprising, a transistor having its base-emitter junction connected in series with said network and said reference voltage in such manner that said transistor is rendered conductive or non-conductive in response to selected unbalance between the voltages of said network and said reference, and its collector-emitter junction connected to said motive means and said pair of voltages in such manner that one or the other of said opposed voltages is rendered effective on said motive means to cause movement thereof in selected direction.

9. In combination with electrical-discharge-machining equipment having means for passing current across a gap between an electrode and a workpiece whereby the workpiece is eroded, servo means for controlling the gap spacing of the electrode and workpiece including electromagnetically controlled reversible motive means operable to vary the gap spacing in response to variations in gap voltage comprising, a network connected across the gap for storing gap voltage potential, a pair of voltages connected to said motive means in opposed polarity relationship, a reference voltage, means for comparing the voltage of the network with the reference voltage and for biasing said motive means for movement in one direction or the other comprising, a transistor having its collector connected to the negative terminals of said opposed voltages through a resistor, means connecting said motive means in series with the lower of said voltages in parallel with said resistor whereby conduction through said transistor causes the higher voltage to signal said motive means to vary gap spacing.

References Cited in the file of this patent

UNITED STATES PATENTS

| | | |
|---|---|---|
| 2,804,575 | Matulaitis | Aug. 27, 1957 |
| 2,871,410 | Matulaitis | Jan. 27, 1959 |